United States Patent [19]

Ikeda

[11] Patent Number: 5,748,343
[45] Date of Patent: May 5, 1998

[54] IMAGE PROCESSING APPARATUS AND METHOD

[75] Inventor: Jun Ikeda, Yokohama, Japan

[73] Assignee: Canon Kabushiki Kaisha, Tokyo, Japan

[21] Appl. No.: 857,902

[22] Filed: May 16, 1997

Related U.S. Application Data

[63] Continuation of Ser. No. 339,166, Nov. 10, 1994, abandoned.

[30] Foreign Application Priority Data

Nov. 12, 1993 [JP] Japan ................................. 5-283172

[51] Int. Cl.[6] .................................................. H04N 1/32
[52] U.S. Cl. ......................... 358/501; 358/530; 382/164; 395/135
[58] Field of Search .................................. 358/500–503, 358/530, 534, 535, 540, 537, 538, 512, 517; 382/162, 164; 395/135, 146, 148

[56] References Cited

U.S. PATENT DOCUMENTS

| | | | |
|---|---|---|---|
| 4,931,860 | 6/1990 | Narumiya | 358/500 |
| 4,998,962 | 3/1991 | Edwards | 358/459 |
| 5,074,206 | 12/1991 | Edwards | 358/459 |
| 5,280,577 | 1/1994 | Trevett | 395/150 |
| 5,313,291 | 5/1994 | Appel et al. | 358/501 |
| 5,475,800 | 12/1995 | Vaughn et al. | 358/518 |
| 5,526,140 | 6/1996 | Rozzi | 358/535 |

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

When input color data requests a draw logic operation between pigments, a RGB draw operation is performed under the control of a controller. The controller performs a YMCK draw operation for a data input which does not require a draw logic operation between pigments so as to increase the number of reproducible gradation levels, reproducible resolution, and throughput. One of the RGB and YMCK draw operations can be properly selected in accordance with draw data supplied from a data source. A draw logic operation between pigments for data which does not require a draw logic operation between pigments can be realized without reducing the number of gradation levels and the resolution.

29 Claims, 10 Drawing Sheets

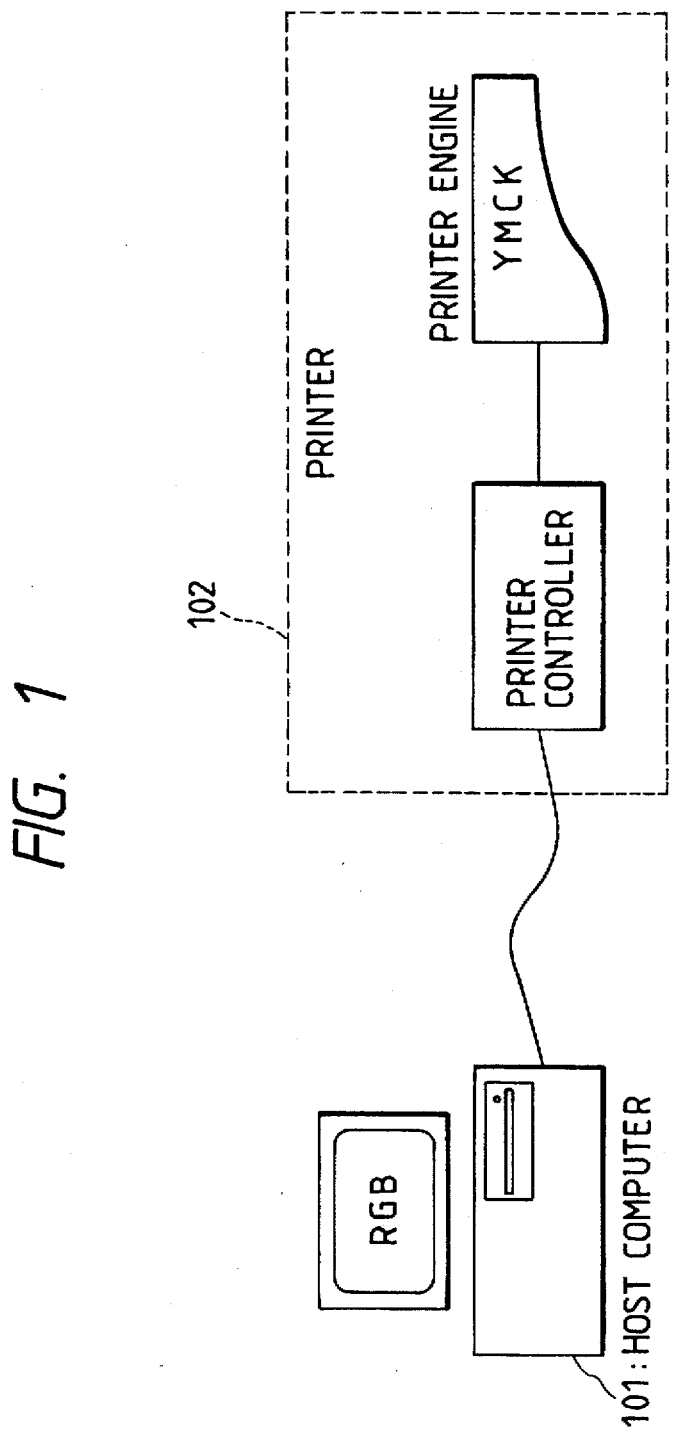

R : RED
G : GREEN
B : BLUE
W: WHITE
Y : YELLOW
M : MAGENTA
C : CYAN
B : BLACK

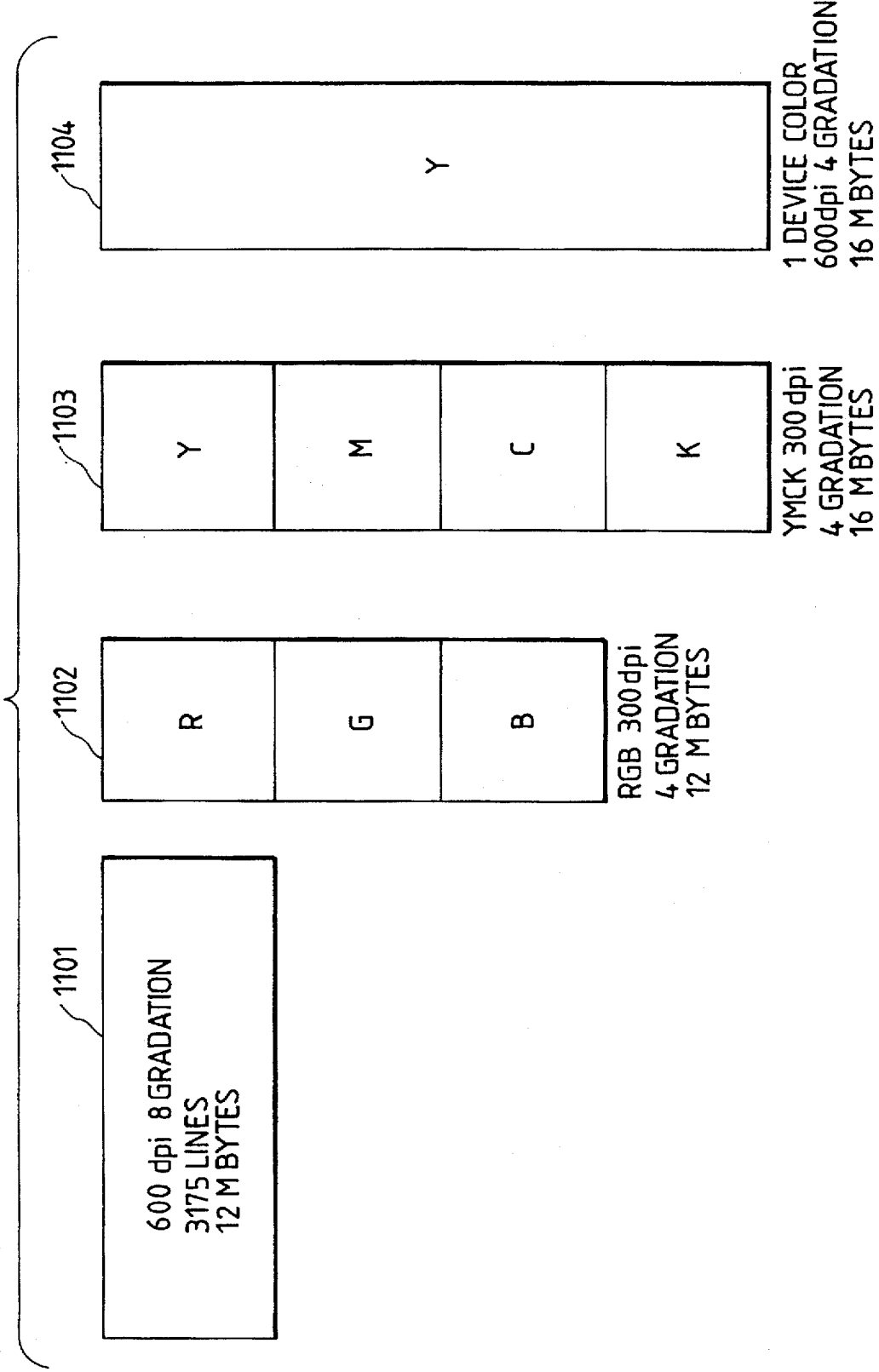

IMAGE PROCESSING APPARATUS AND METHOD

This application is a continuation of application Ser. No. 08/339,166 filed Nov. 10, 1994, now abandoned.

BACKGROUND OF THE INVENTION

1. Field of the Invention

The present invention relates to an image processing apparatus such as a color printer or the like connected to an information processing apparatus such as a host computer, and a method therefor.

2. Related Background Art

A general document processing/printing apparatus such as a document forming/printing system is arranged, as shown in FIG. 1. From the left in FIG. 1, a host computer 101 serving as a processing apparatus for processing (e.g., composition) an output document is connected to a printer 102 for fixing and printing output information data processed by the host computer 101 on a medium such as paper to constitute the document processing/printing apparatus. More specifically, a user edits an image to be output from the host computer 101. When editing is completed, the image is converted into output image data capable of being received by the printer 102. The image data is then output to the printer 102, and printing is realized on a paper surface by the printer 102 in accordance with the input data.

To express a color image on a display of the host computer 101, internal data is expressed by an RGB (red, green, and blue) additive primaries method due to the arrangement of the display. On the other hand, a YMCK (yellow, magenta, cyan, and black) expression as a subtractive primaries method depending on the device used as the printer 102 is used on the paper surface (FIGS. 2A and 2B), as is well known.

For this reason, RGB→YMCK conversion must be performed on the host computer 101 side or the printer 102 side in accordance with a certain method. This method is known well, and a detailed description thereof will be omitted.

In a system having a draw logic operation between pigments, the OS (Operating System) on the host computer 101 side includes this draw logic operation function. For example, in the absence of a draw logic operation between pigments as in the conventional system, as shown in FIG. 3A, only one rule such as an overwrite operation is used to perform overlap drawing of R, G, and B circles. However, as shown in FIG. 3B, in some system, a host computer OS has a function of draw logic operations between pigments in the overlapping portions of the Y, M, and C circles, and application software which operates in the host computer need not recognize draw logic operation results between pigments.

More specifically, to perform the drawing shown in FIG. 3B, application software which operates in a host computer supporting a draw logic operation between pigments need only designate an instruction for drawing each of the Y, M, C circles and a rule for the draw logic operations between pigments to the OS which operates in the host computer.

To realize this in a conventional system which does not support a draw logic operation between pigments, application software must extract the overlapping portions of the Y, M, and C circles, perform the draw logic operations between pigments for the color of a figure constituted by the extracted portions, perform an overwrite operation for drawing the figure of each overlapping portion as a figure different from a circle, and designate the color of the drawn portion.

Assume that an OS which operates in a host computer supports a draw logic operation between pigments. In this case, unless a printer to be connected to the host similarly supports a draw logic operation between pigments, the same processing as in a conventional host which does not support a draw logic operation between pigments must be performed by application software on the host side or printer driver software.

To perform this draw logic operation between pigments, the user designates a draw logic operation rule between pigments as the R, G, and B because an output image is generated on the display on the host side. A draw logic operation between pixels to be drawn as R, G, and B pixels must be performed on the printer side.

A draw logic operation between pigments cannot usually be performed using data obtained upon RGB→YMCK conversion. In particular, the memory resource is finite in an installed device having no virtual space. For this reason, in RGB→YMCK conversion or the like, the number of gradation levels or the resolution is often reduced. In this case, conversion itself is irreversible conversion, and the image quality suffers.

Internal color data processing for realizing a color printer is classified into YMCK processing (FIG. 6) and RGB processing (FIG. 7). In the former case, it is difficult to perform a draw logic operation between pigments. In the latter case, when the storage area of RGB data is one memory bank, one Y, M, C, or K pixel is generated by one R, G, or B pixel. Therefore, a bus band which is three times the output bus bandwidth of the process color (YMCK) is required, and the number of gradation levels or the resolution must be reduced.

When an apparatus is arranged according to the latter method, the number of gradation levels or the resolution is reduced by the bus band problem. A draw request from the user does not always require a draw logic operation between pigments. When data which does not require a draw logic operation between pigments is input, the resultant YMCK device unconditionally reduces the number of gradation levels or the resolution.

SUMMARY OF THE INVENTION

It is an object of the present invention to provide a color image processing apparatus which solves the conventional problems described above.

It is another object of the present invention to provide an image processing apparatus and method, which can perform optimal processing on the basis of the contents of input color information.

In order to achieve the above objects of the present invention, there is provided an image processing apparatus for receiving color information from information processing means, performing a color process, and outputting the color-processed information to image forming means, comprising:

determination means for determining whether the input color information requires a draw operation;

first image generation means for performing image generation in a first signal form when the determination means determines that the draw operation is required; and second image generation means for performing image generation in a second signal form when the determination means determines that the draw operation is not required.

The above and other objects, features, and advantages of the present invention will be apparent from the following description of preferred embodiments in conjunction with the accompanying drawings.

BRIEF DESCRIPTION OF THE DRAWINGS

FIG. 1 is a block diagram showing the schematic arrangement of a general document forming system;

FIG. 11 is a view showing the principle of the arrangement of an image memory for realizing the same effect as in the present invention according to the embodiment shown in FIG. 10.

DETAILED DESCRIPTION OF THE PREFERRED EMBODIMENTS (First Embodiment)

An embodiment of the present invention to be described in detail below exemplifies a color image information output apparatus, connected to an image information source such as a host computer, for fixing an output image on a recording medium such as paper.

This color image information output apparatus comprises a means for performing an internal RGB draw operation when input color data requires a drawing logic operation between pigments. The color image information output apparatus also comprises a means for performing internal YMCK draw operations for data inputs which are free from a draw logic operation between pigments so as to improve the gradation reproducibility, resolution, and throughput of the image output apparatus.

The color image information output apparatus also comprises a means for properly selecting one of these internal YMCK and RGB draw operations in accordance with draw data included in image information supplied from a data source.

An embodiment of the present invention will be described in detail with reference to the accompanying drawings.

Figure 8:
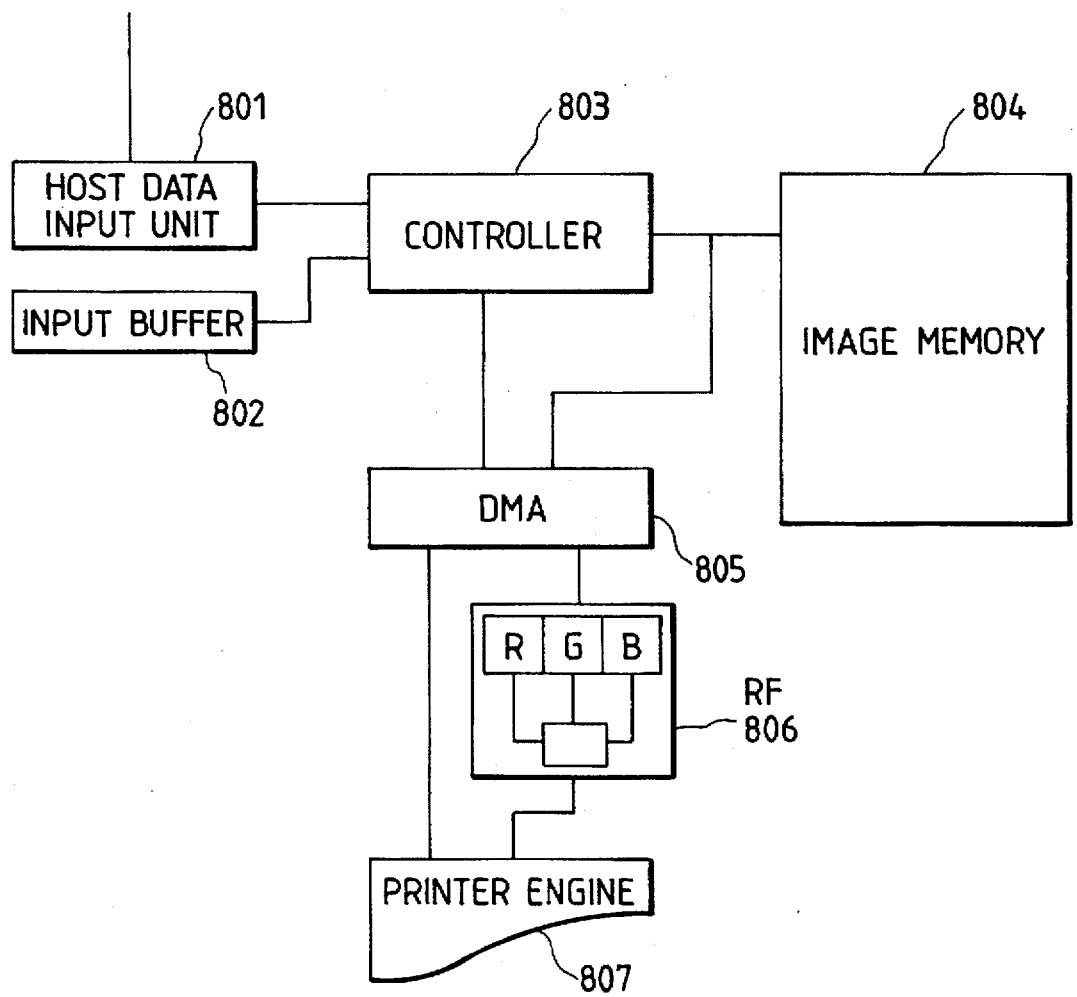
FIG. 8 is a block diagram showing an embodiment of the present invention.

FIG. 8 is a block diagram showing the general arrangement of a color image information output apparatus serving as an embodiment of the present invention.

Note that the color image information output apparatus is an apparatus corresponding to the printer 102 in FIG. 1 and is connected to the host computer 101 therein.

A host data input unit 801 receives output image data, input draw instruction, and the like from a data source such as a host computer.

More specifically, the host data input unit 801 is a parallel interface, a serial interface, a network interface, or the like.

An input buffer 802 stores draw instruction data of one page input from the host. In this block diagram, the input buffer 802 stores the data in a form independent of the form of an image memory (to be described later). The input buffer 802 and the image memory may be constituted by a physically single memory serving as a main memory. Note that any physical memory arrangement (e.g., an SRAM/DRAM) may be employed.

A controller 803 controls the overall image information output apparatus. More specifically, the controller 803 uses a processor such as a CPU to analyze the input draw instruction data included in information from the host computer, generate image data, and controls the respective components of the apparatus.

An image memory 804 stores draw image data generated by the controller 803 in accordance with the draw instruction data from the host computer. The image memory 804 comprises, e.g., a DRAM.

A DMA 805 transfers the image data stored in the image memory 804 to a printer engine 807 (to be described later).

An RF unit 806 converts input R, G, and B data into Y, M, C, and K device colors. Although RGB→YMCK conversion using matrix operations is known, hardware using a parameter table is arranged in favor of the conversion speed. One device color pixel is output in synchronism with the printer engine 807 on the basis of each pixel of R, G, and B pixels (three pixels). Note that selection of one of the Y, M, C, and K device colors can be set by the controller 803 in advance.

The printer engine 807 receives draw image data and fixes a color image on a paper surface. The printer engine 807 is a device for repeating the process color (YMCK) draw operation four times in accordance with a frame sequential scheme to generate a color output image of one page. The printer engine 807 comprises, e.g., a color LBP (Laser Beam Printer).

Figure 9:
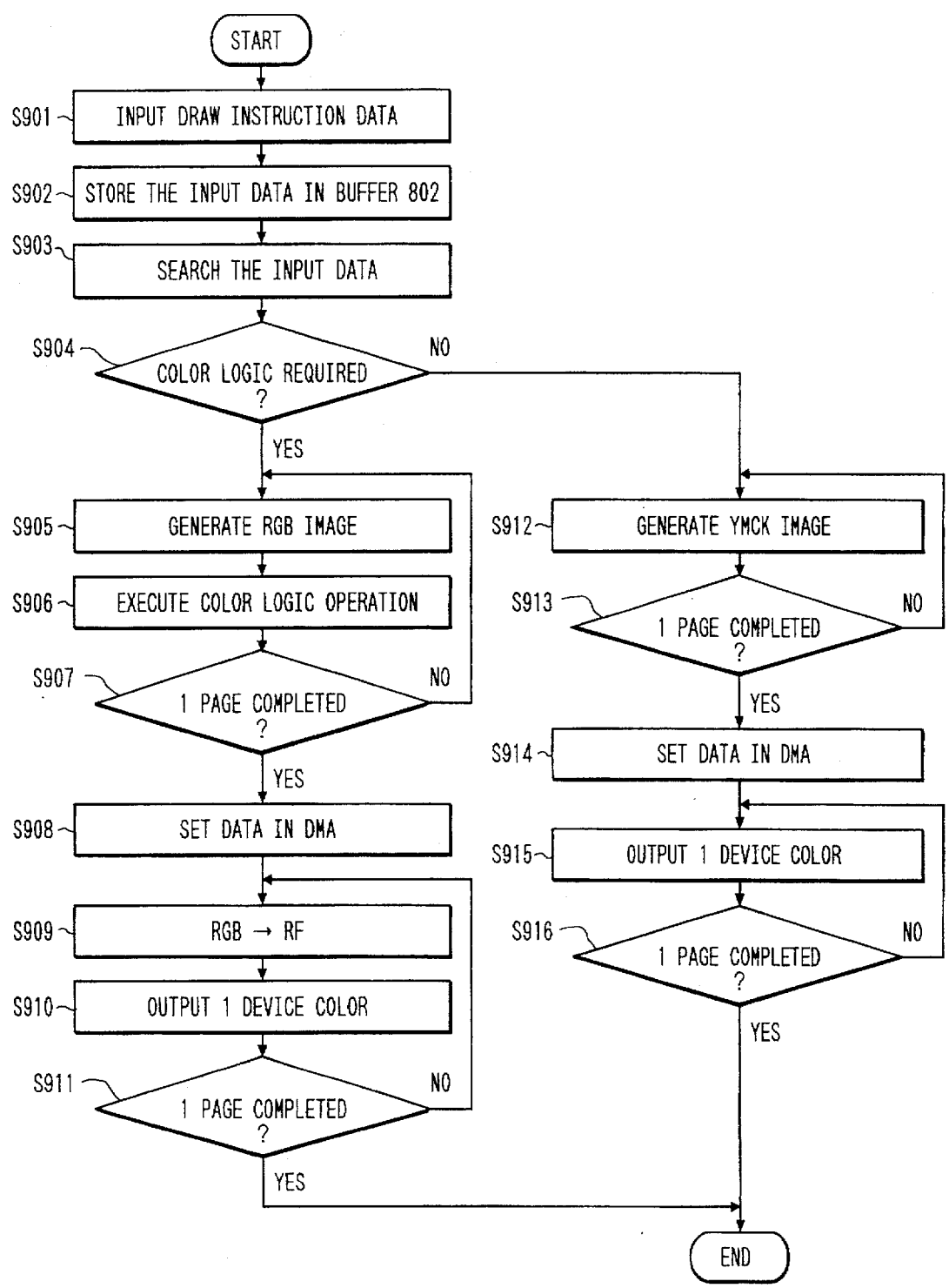
FIG. 9 is a flow chart showing a control flow of the embodiment shown in FIG. 8.

The operation of the color image information output apparatus constituted by these means will be described with reference to a flow chart in FIG. 9.

Draw instruction data including an image output instruction from the host computer is input through the host data input unit 801 (step S901). In this case, the draw instruction data comprises a printer language such as PDL (Printer Description Language) or a command string such as an escape sequence predetermined by the printer.

The input draw instruction data is temporarily stored in the input buffer 802 (step S902). As a method of storing data in the input buffer, data of one page is transferred from the host data input unit 801 to the input buffer 802 by the controller 803.

After the draw instruction data of one page is stored in the input buffer 802, the controller 803 searches this data of one page in accordance with a predetermined algorithm (step S903) to determine whether a draw logic operation between pigments is required (step S904).

More specifically, in steps S903 and S904, the input data from the host side is checked to determine whether a draw logic operation between pigments is designated. That is, input data is searched to determine for each page of the data whether a logic operation draw designation command from the host computer is present.

As another example of these steps, a logic operation to be performed when images overlap each other is designated in advance. Input data is then searched to determine whether an overlapping portion is present in the data of the draw instruction stored in the input buffer 802.

Note that the designated logic operation can be appropriately changed on the basis of a command from the host computer.

If it is determined in step S904 that a draw logic operation between pigments is present, the flow advances to step S905; otherwise, the flow advances to step S912.

Figure 2A:
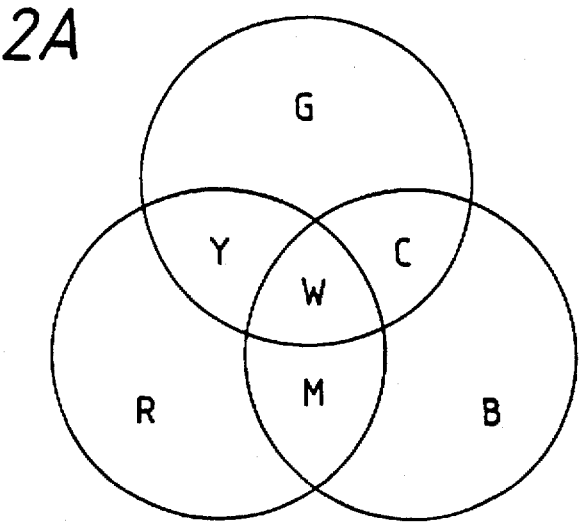
FIG. 2A is a view showing a sample in the additive primaries method for a CRT display and a printer for realizing a color output.
Figure 2B:
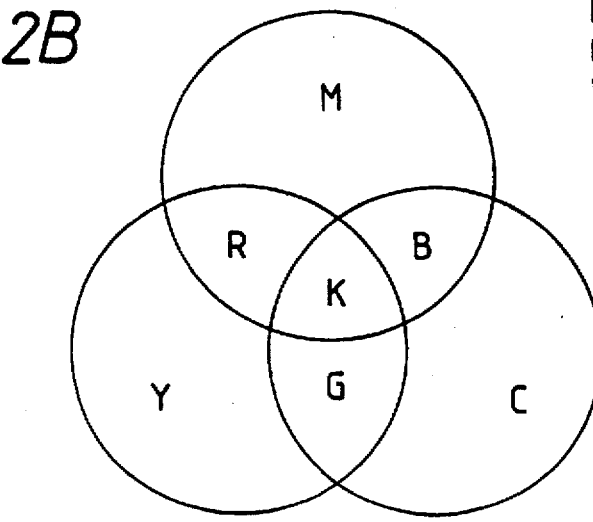
FIG. 2B is a view showing a sample in the subtractive primaries method for a CRT display and a printer for realizing a color output.
Figure 3A:
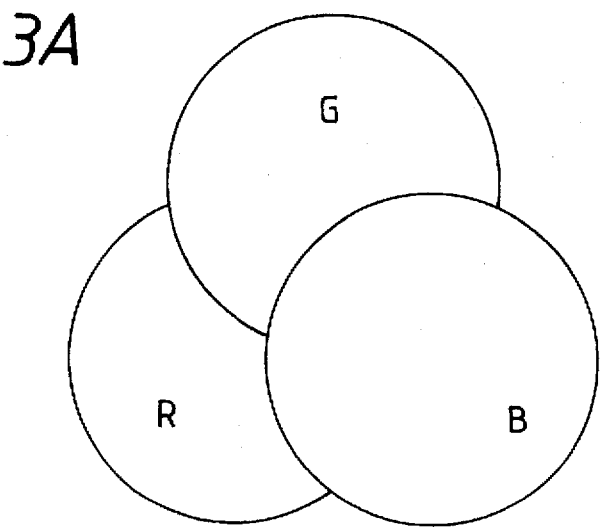
FIGS. 3A and 3B are views showing the drawn samples when a draw logic operation between pigments is not performed and is performed, respectively.
Figure 3B:
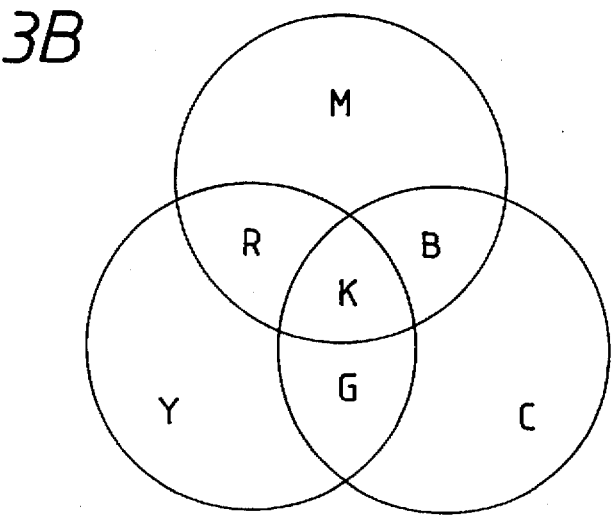
Figure 4:
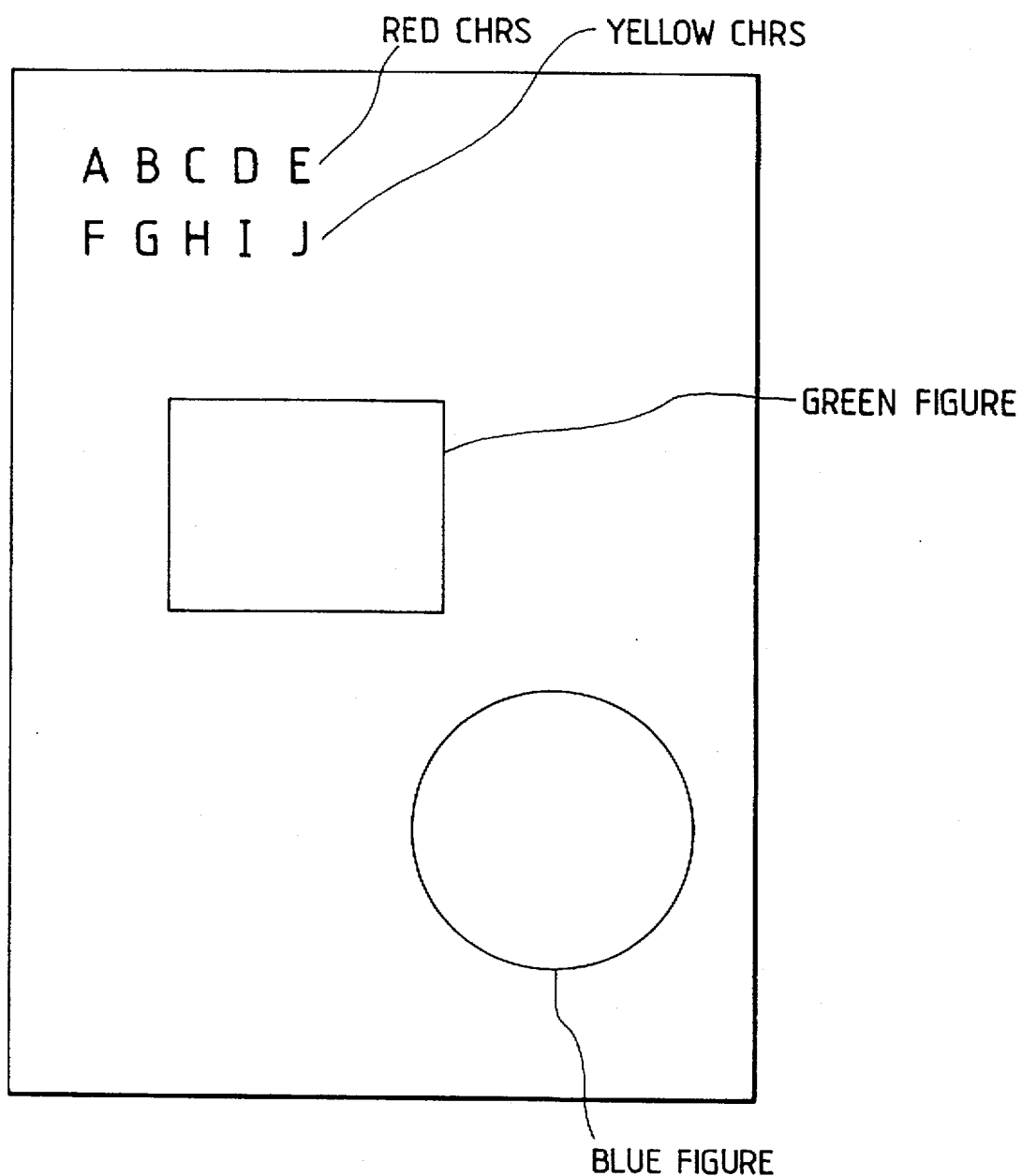
FIG. 4 is a view showing a print sample in the absence of a draw logic operation between pigments.

For example, the flow advances to step S912 for output image data which does not require a draw logic operation between pigments as in FIG. 4.

Figure 5:
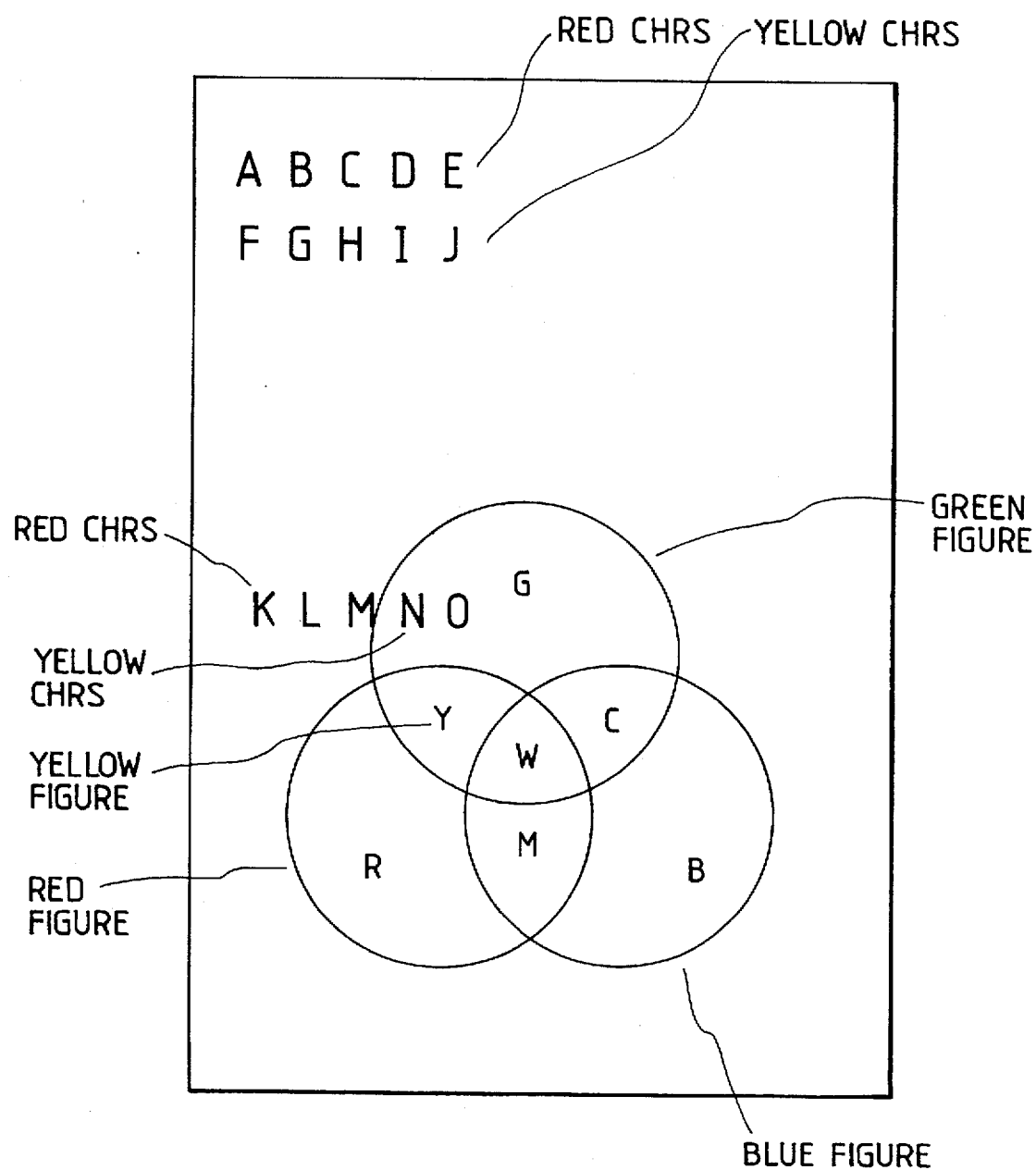
FIG. 5 is a view showing a print sample in the presence of a draw logic operation between pigments.
Figure 6:
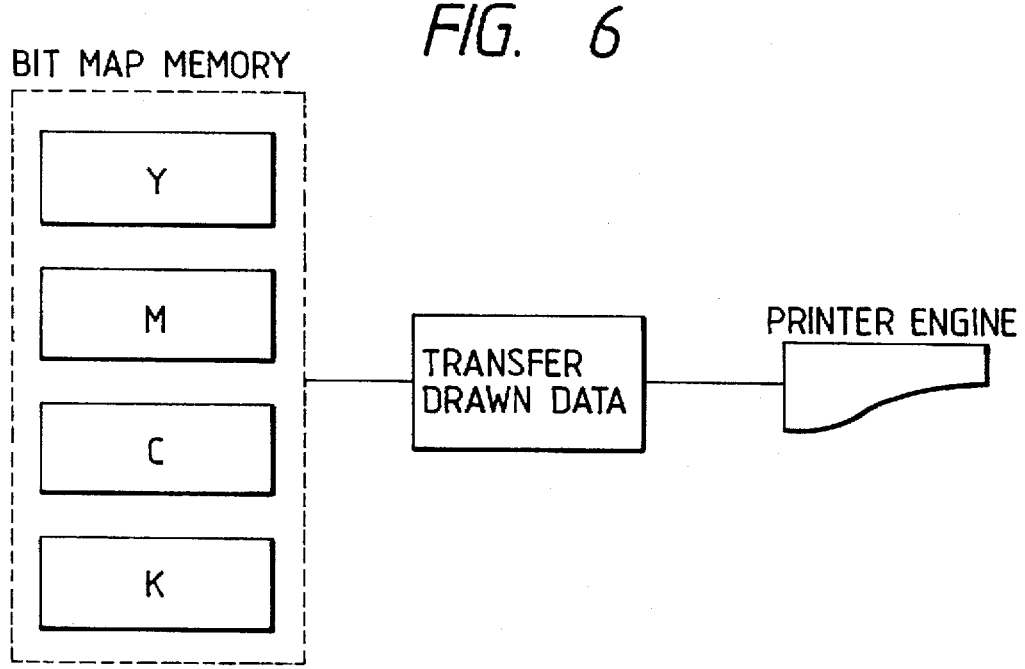
FIG. 6 is a view showing the principle of a memory arrangement when image data is generated using a YMCK system as a device color system.
Figure 7:
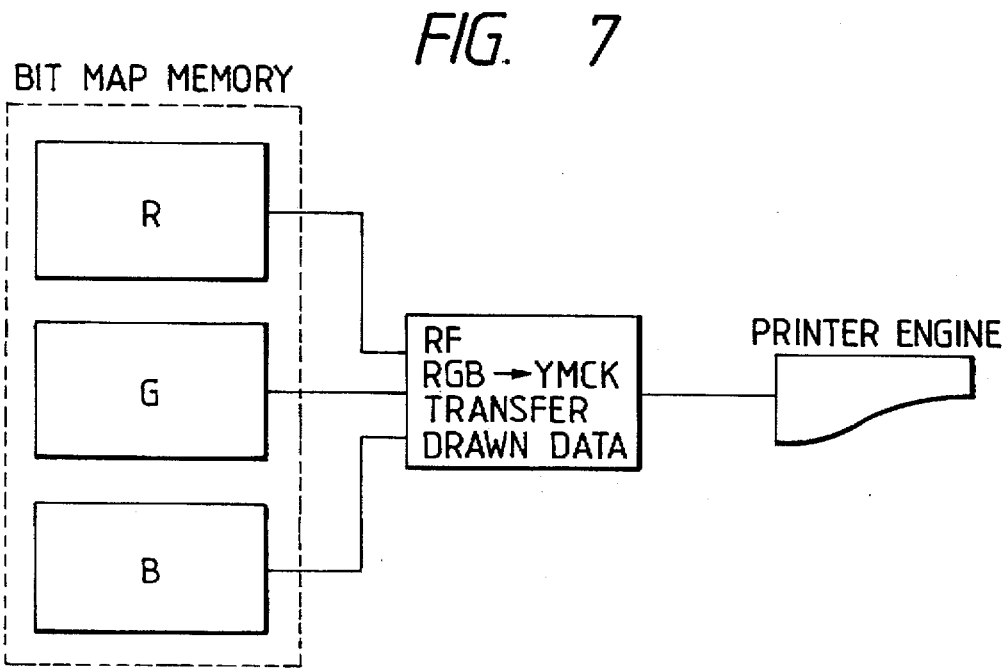
FIG. 7 is a view showing the principle of a memory arrangement when image data is generated using an RGB system.

When output image data which requires a draw logic operation between pigments is present as in FIG. 5, the flow advances to step S905.

If YES in step S904, an RGB image is generated and stored in the image memory 804 in accordance with the draw instruction stored in the input buffer 802 (step S905).

In this case, the designated draw logic operation between pigments is performed for a portion which requires this operation (step S906).

It is then determined whether an RGB output image of one page is completed (step S907).

Steps S905 to S907 are repeated until generation of the output RGB image of one page is completed (step S907). The processing unit in the draw logic operation between pigments is not limited to a specific processing unit but may be one raster image or one pixel image.

When the RGB data of one page is generated, the controller 803 sets parameters of image data to be output, i.e., the start addresses at which R, G, and B images are stored, their data lengths, and the like (step S908).

When setting of the parameters in the DMA is completed, the controller 803 starts the printer engine 807 and at the same time sets an output image data path of the image memory 804, the DMA 805, the RF unit 806, and the printer engine 807. The DMA 805 starts image data transfer in synchronism with the printer engine 807. In operation, one processing unit of the R image data, one processing unit of the G image data, and one processing unit of the B image data are set in the RF unit 806 (step S909).

The RF unit 806 converts the input R, G, or B data input in real time into any one of the Y, M, C, and K device colors, which is synchronized with the printer engine, and outputs the converted device color (step S910).

Note that one processing unit of each of the R, G, and B image data transferred by the DMA 805 is a unit determined by the hardware system configuration and is not limited to a specific unit. One processing unit may be a word transfer unit corresponding to a bus width or a buffering capacity unit in a data path.

If one processing unit of the DMA is defined as one word, the DMA 805 sends image data pixels of three words constituted by R, G, and B words. The above routine for outputting one word in response to one-process color pixels (device color pixels) is repeated. When the output of one page of the first device color is completed, the controller 803 causes the RF unit to perform the same operations as described above for M as the second device color. These operations are repeated for all the Y, M, C, and K device colors, thereby obtaining a color image output of one page (step S911).

The bus band may exceed an allowable amount due to the relationship between the total capacity of the transfer data transferred from the image memory 804 to the RF unit 806 under the control of the DMA 805 and the engine speed. This relationship is based on the reproducible gradation and resolution of the printer engine, the engine speed, and the like. The processing capacity of the CPU and the like is used up in data transfer, and other processes such as color image generation cannot be performed.

The bus band is defined as a data transfer rate.

More specifically, a transfer rate which is three times that of YMCK storage in the image memory is required because one-word device data is generated in 3-word (R, G, and B) access to the image memory 804.

For this reason, a possibility that the bus band exceeds the allowable amount increases.

When the bus band exceeds the allowable amount, the number of reproducible gradation levels is reduced, so that the data amount representing one pixel is reduced. The bus band can then be caused to fall within the allowable amount range.

More specifically, it is determined on the basis of the total transfer data capacity based on the reproducible gradation, the resolution and the like, and the engine speed whether the bus band exceeds the allowable amount. If so, the number of gradation levels is reduced to generate a color image in RGB image generation in the PDL received by the controller 803 in step S905.

Alternatively, the resolution is reduced to reduce the total transfer data amount so that the bus band falls within the allowable amount range.

More specifically, in step S905, an RGB image is generated and is thinned and stored in the image memory 804.

When the bus band exceeds the allowable amount, the data amount must be reduced, and this leads to degradation in the quality of an output image.

When the draw instruction data of one page stored in the input buffer 802 is determined as data which does not require a draw logic operation between pigments, i.e., data shown in FIG. 4, the controller 803 generates an image using the device colors (YMCK) for the image memory 804 (step S912). The RF unit 806 performs RGB→YMCK conversion, as described above.

Note that this conversion can be realized by software or hardware.

When generation of image data of one page is completed (step S913), the controller 803 sets parameters, e.g., the start addresses of device color (YMCK) image data in the image memory 804 and their data lengths in the DMA 805 (step S915) as in step S908. The controller 803 starts the printer so as to perform printing. At the same time, the controller 803 sets a data output path of the image memory 804, the DMA 805, and the printer engine 807 from the image memory 804.

The DMA 805 sends device color image data stored in the image memory 804 to the printer engine for each device color in synchronism with the printer engine 807 as in step S910 (step S915). The above operations are performed for all the device colors (YMCK) to obtain a color output image of one page (step S916).

When device color (YMCK) image data are generated and stored in the image memory 804, unlike in the generation of RGB image data, a rate of 1:1 is established, that is, the data transfer rate of one process color from the image memory 804 becomes equal to the transfer rate of the image data sent to the printer engine.

The transfer rate of YMCK image is lower than that of RGB image generation since a draw logic operation is performed.

Data having a high resolution and a high gradation reproducibility can thus be processed.

Data is stored in the form of YMCK signals in the image memory, so that RGB→YMCK conversion need be performed only once, thereby increasing the processing speed.

This processing can cope with a high engine speed.

As described above, according to this embodiment, the printer language is converted into image data on the printer side, and therefore the load on the host computer can be reduced.

Communication between the host computer and the printer can be performed using a printer language, so that communication can be performed efficiently at high speed.

Processing is changed on the basis of the contents represented by the printer language, so that optimal processing can be performed.

More specifically, it is determined in accordance with input data whether internal image generation for a color image to be output is to be performed using the RGB or YMCK color system, and the RGB or YMCK color system is selectively used. For this reason, there is provided a color image information output apparatus which realizes a draw logic operation between pigments without reducing the number of gradation levels and the resolution for data which does not require a draw logic operation between pigments.

(Modifications)

In the first embodiment described above, the image memory 804 comprises an image memory of one RGB or YMCK page. The present invention is not limited to this.

For example, the controller may generate image data while the image data is being output to the printer engine. With this arrangement, a memory of one page need not be arranged (to be referred to as a binding process hereinafter).

Figure 10:
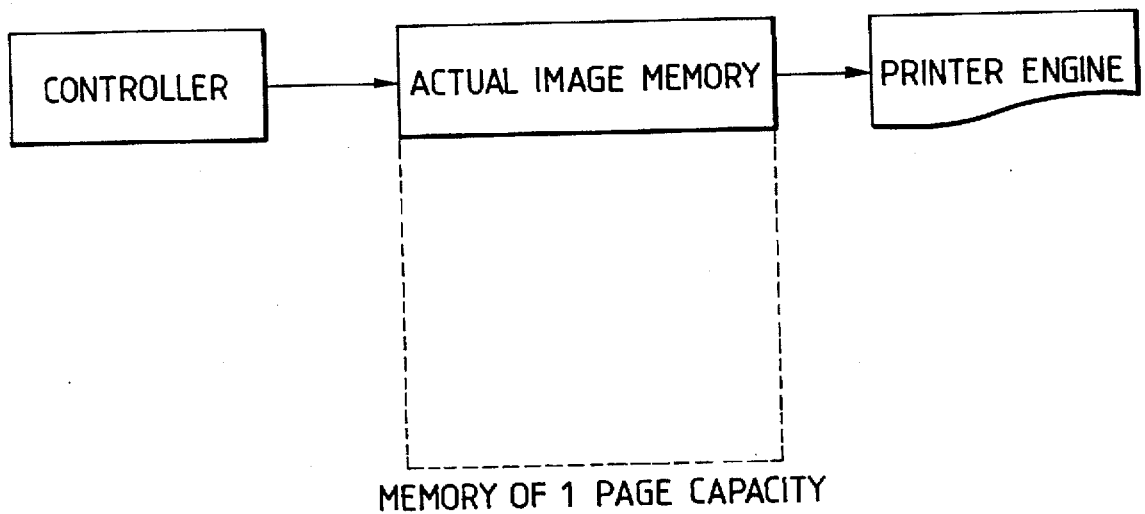
FIG. 10 is a block diagram showing an apparatus not having a memory of a one page capacity so as to realize the same effect as in the present invention according to another embodiment of the present invention.

FIG. 10 is a view showing the principle of the binding process. The controller generates image data corresponding to several lines on the paper surface, and at the same time outputs the generated image data to the printer engine. Therefore, the image memory itself need not have a one-page image data storage capacity, and the apparatus can be constituted using a memory having a small capacity.

This arrangement may not be realizable in a page printer such as an LBP (Laser Beam Printer) when draw data is complicated. That is, if the draw data is complicated, it takes too much time for the controller to generate image data in the image memory, and image data output to the printer engine is delayed.

To solve this problem, the number of gradation levels or the resolution is reduced to assure a one-page memory capacity in the image memory, or the speed of the printer engine is reduced. In general, it is easier to reduce the number of gradation levels or the resolution because the printer engine speed is kept constant in view of processes.

As shown in FIG. 11, for example, when a resolution of 600 dpi in eight gradation levels is to be realized by 12 Mbytes in the binding process of the image memory (1101), a binding memory of about 3,175 lines per process color can be assured for data on an A4 paper surface.

When a draw logic operation between pigments is not required, the above image data is output.

When image data which requires a draw logic operation between pigments is to be output, an image memory arrangement can be realized at an RGB resolution of 300 dpi in four gradation levels as in 1102 in FIG. 11. When the binding process causes a delay in outputting the data to the printer engine although a draw logic operation between pigments is not required, the resolution may also be reduced to an RGB resolution of 300 dpi in four gradation levels.

If the image memory has a capacity of 16 Mbytes, memory allocation such as 1103 and 1104 in FIG. 11 may be performed. However, the memory allocation is not limited to these combinations.

In the first embodiment, the DMA is used to output image data from the image memory to the printer engine. However, the memory access is not limited to this. For example, the controller may transfer data to the printer engine.

In this embodiment, after draw instruction data of one page is stored in the input buffer, it is determined whether a draw logic operation between pigments is required. However, the present invention is not limited to this. For example, whether a draw logic operation between pigments is performed may be set before the draw instruction data of one page is output. This setting form may be given in the form of an added instruction or flag at the start of draw instruction data, which indicates whether a draw logic operation between pigments is performed, or in the form of an input operation by the user on a console panel arranged in the printer device.

The host computer may set a reduction in the resolution or the number of gradation levels when the bus band of the image memory exceeds an allowable amount.

When a process can be set from the host computer as described above, a process desired by the user can be performed.

The user can set a process on the basis of whether the resolution or gradation is important.

In the first embodiment described above, the LBP is used as the output printer. The present invention is not limited to this. For example, an ink-jet printer, a color copying machine, or the like may be used.

A printer having a head of a type which causes film boiling with thermal energy to inject a liquid drop may be used.

The above printer does not perform the color process in the printer device. However, color processes such as undercolor removal may be performed in the printer.

In the color processes, an image signal may be converted into a signal such as an L*a*b* signal or a YIQ signal.

In the first embodiment, C, M, Y, and K are used as the device colors. However, three colors such as C, M, and Y may be used, or five colors consisting of C, M, Y, K, and a specific color may be employed.

Whether a color logic operation is performed need not be determined for each page. For example, a process may be determined for each object or each designated area, and processing may be switched for each object or each area.

When the process is switched for each object, an optimal process for each image can be set for a target image which is formed by synthesis of a plurality of images having different features, thereby efficiently processing the target image.

In the above embodiment, whether a draw logic operation is present is determined. However, the present invention is not limited to the draw logic operation.

Any draw operation capable of processing RGB data easier than YMCK data, e.g., AND/OR operations for synthesizing R, G, and B components at a predetermined ratio may be performed.

In the above embodiment, in case of Y, M, C and K printing (i.e., printing of no draw logic operation), the printing is performed after Y, M, C and K image data are all generated. However, the present invention is not limited to the above operation. That is, the printing may be performed after draw image data of each process color is generated. Specifically, an operation flow may advance according to the order of Y image data generating, Y image data printing, M image data generating, M image data printing, C image data generating, C image data printing, K image data generating and K image data printing.

Various changes and modifications of the present invention may be made within the scope of the appended claims.

What is claimed is:

1. An image processing apparatus for receiving input color information from information processing means, performing a color process, and outputting the color-processed information to image forming means, said apparatus comprising:
   determination means for determining whether the input color information requires a draw operation;
   first image generation means for performing image generation in a first signal form when said determination means determines that the draw operation is required; and
   second image generation means for performing image generation in a second signal form when said determination means determines that the draw operation is not required,
   wherein said determination means determines whether an image overlapping portion is present.

2. An apparatus according to claim 1, wherein the first signal form is in an RGB signal form.

3. An apparatus according to claim 1, wherein the second signal form is in a YMCK signal form.

4. An apparatus according to claim 1, wherein the input color information represents a printer language.

5. An apparatus according to claim 1, wherein said determination means performs determination for said processing means.

6. An apparatus according to claim 1, wherein said determination means performs determination for each of a plurality of objects in a page of data comprising the input color information.

7. An apparatus according to claim 1, wherein said determination means determines whether a logic operation draw designation command is present.

8. An image processing method of receiving input color information from information processing means, performing a color process, and outputting the color-processed information to image forming means, comprising the steps of:
   determining whether the input color information requires a draw operation;
   performing image generation in a first signal form when it is determined in said determination step that the draw operation is required; and
   performing image generation in a second signal form when it is determined in said determination step that the draw operation is not required,
   wherein said determination step determines whether an image overlapping portion is present.

9. A method according to claim 8, wherein the first signal form is in an RGB signal form.

10. A method according to claim 8, wherein the second signal form is in a YMCK signal form.

11. A method according to claim 8, wherein the input color information represents a printer language.

12. A method according to claim 8, wherein said determination step performs determination for said processing means.

13. A method according to claim 8, wherein said determination step performs determination for each of a plurality of objects in a page of data comprising the input color information.

14. A method according to claim 8, wherein said determination step determines whether a logic operation draw designation command is present.

15. An image processing apparatus comprising:
   input means for inputting color information including draw instruction data;
   determination means for determining whether or not the input color information requires a draw logic operation between colors;
   first image generation means for generating, by performing the draw logic operation between colors, a color image corresponding to the input color information in a first color system when said determination means determines that the draw logic operation is required; and
   second image generation means for performing an image generation corresponding to the input color information in a second color system when said determination means determines that the draw operation is not required.

16. An apparatus according to claim 15, wherein the first color system is in a RGB signal form.

17. An apparatus according to claim 15, wherein the second color system is in a YMCK signal form.

18. An apparatus according to claim 15, wherein the input color information represents a printer language.

19. An apparatus according to claim 15, wherein said determination means determines whether a logic operation draw designation command is present.

20. An apparatus according to claim 15, wherein said determination means determines whether an image overlapping portion is present.

21. An apparatus according to claim 15, wherein the input color information is represented by a page description language.

22. An apparatus according to claim 15, further comprising developing means for developing output image data to a memory, on the basis of first and second signals respectively supplied from said first and second image generation means.

23. An apparatus according to claim 15, wherein color data included in the input color information is represented by the first color system.

24. An apparatus according to claim 23, wherein the first color system is a RGB color system, and the second color system is a YMCK color system.

25. An image processing method comprising the steps of:
   inputting color information;
   determining whether or not the input color information requires a draw logic operation between colors;
   performing an image generation corresponding to the input color information in a first color system when it is determined in said determining step that the draw logic operation is required;
   performing the draw logic operation for color data of the first color system;
   converting color data of the first color system for which the draw logic operation is performed in said draw logic operation performing step, into color data of a second color system; and
   performing an image generation in the second color system when it is determined in said determining step that the draw operation is not required.

26. An image processing method comprising:
   an input step of inputting color information including draw instruction data;
   a discrimination step of discriminating, by analyzing the draw instruction data, whether or not the input color information requires a draw logic operation between colors;

a first image generation step of performing, by performing the draw logic operation between colors, a first color conversion on the input color information when it is discriminated in said discrimination step that the draw logic operation is required; and a second image generation step of performing a second color conversion on the input color information when it is discriminated in said discrimination step that the draw logic operation is not required.

27. An image processing apparatus comprising:

input means for inputting color information including draw instruction data;

discrimination means for discriminating, by analyzing the draw instruction data, whether or not the input color information requires a draw logic operation between colors;

first image generation means for performing, by performing the draw logic operation between colors, a first color conversion on the input color information when said discrimination means discriminates that the draw logic operation is required; and second image generation means for performing a second color conversion on the input color information when said discrimination means discriminates that the draw logic operation is not required.

28. An apparatus according to claim 27, further comprising formation means for forming a color image on the basis of the color image data which has been subjected to the first or second conversion.

29. An apparatus according to claim 27, wherein said first image generation means develops the input color information into a memory by using RGB data, on the basis of the draw instruction data.

* * * * *

UNITED STATES PATENT AND TRADEMARK OFFICE
CERTIFICATE OF CORRECTION

PATENT NO. : 5,748,343

DATED : May 5, 1998

INVENTOR(S) : JUN IKEDA

It is certified that error appears in the above-identified patent and that said Letters Patent is hereby corrected as shown below:

<u>COLUMN 12</u>

Line 13, "claim 27," should read --claim 28,--.

Signed and Sealed this

Third Day of November, 1998

*Attest:*

BRUCE LEHMAN

*Attesting Officer*     Commissioner of Patents and Trademarks